United States Patent [19]
Tomisawa

[11] Patent Number: 5,996,107
[45] Date of Patent: Nov. 30, 1999

[54] ERROR CORRECTION DECODER INCLUDING AN ADDRESS GENERATION CIRCUIT

[75] Inventor: Shinichiro Tomisawa, Gifu-ken, Japan

[73] Assignee: Sanyo Electric Co., Ltd., Osaka, Japan

[21] Appl. No.: 08/971,353

[22] Filed: Nov. 17, 1997

[30] Foreign Application Priority Data

Nov. 14, 1996 [JP] Japan ................................. 8-303178

[51] Int. Cl.[6] ........................................... G06F 11/10
[52] U.S. Cl. ........................................ 714/766; 714/805
[58] Field of Search .................................. 714/764, 798, 714/763, 752, 746, 799, 819, 820, 821, 766, 805, 755; 360/18; 341/94

[56] References Cited

U.S. PATENT DOCUMENTS

5,239,640  8/1993  Froemke et al. ........................... 714/1
5,844,919  12/1998  Glover et al. ........................... 714/769
5,848,076  12/1998  Yoshimura ............................... 714/763

Primary Examiner—Albert De Cady
Assistant Examiner—David Ton
Attorney, Agent, or Firm—Sheridan Ross P.C.

[57] ABSTRACT

An error correction decoder for correcting errors in digital data includes an address generation circuit capable of generating addresses for accessing a first buffer memory and a second buffer memory. The first buffer memory preferably stores user data, and the second buffer memory stores parity code data associated with the user data. An input controller receives input data and stores the input data in the first and second buffer memories in accordance with the addresses generated by the address generation circuit. An error correction circuit receives user data and associated parity code data, performs error correction, and rewrites the corrected data and parity code data back to the respective memory areas. An output controller then read the error-corrected user data from the first buffer memory.

4 Claims, 6 Drawing Sheets

ERROR CORRECTION DECODER INCLUDING AN ADDRESS GENERATION CIRCUIT

BACKGROUND OF THE INVENTION

1. Field of the Invention

The present invention relates generally to an error correction decoder. More particularly, the present invention relates to an error correction decoder for correcting errors in digital data read from a recording medium, and an address generation circuit suitable for use with the decoder.

2. Description of the Related Art

In a CD-ROM system, a CD (Compact Disk) is used as a read only memory (ROM) for storing digital audio data. In order to enhance the reliability of the data read from the CD, the CD-ROM system performs double error correction on the read data. The first error correction is executed in a digital signal processor which is shared by an audio system, while the second error correction is performed by a CD-ROM decoder for the CD-ROM system.

Figure 1:
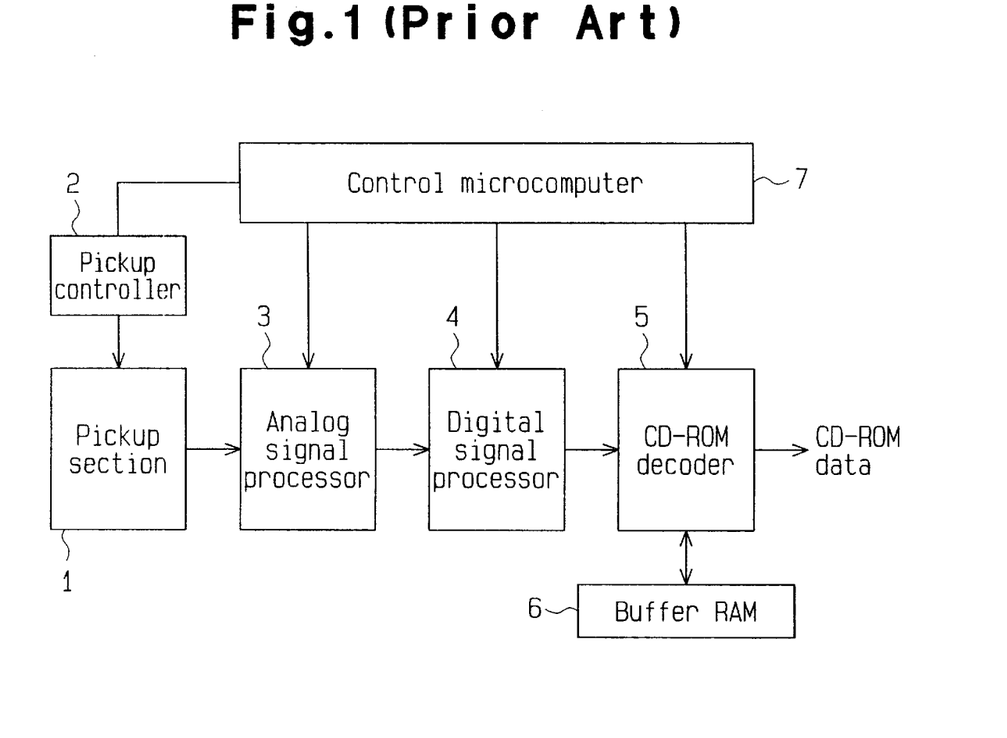
FIG. 1 is a schematic block diagram of a conventional prior art CD-ROM system.
Figure 2:
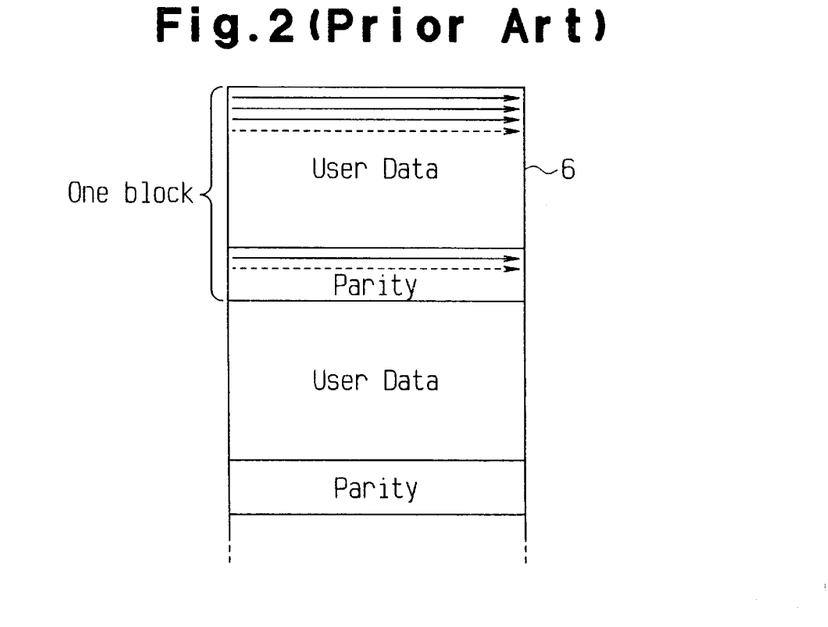
FIG. 2 shows the format of CD-ROM data stored in memory.

FIG. 1 is a schematic block diagram of a CD-ROM system. FIG. 2 shows the format of data recorded on a CD. The data includes user data and parity code data which are used to detect and correct errors in the user data. The user data and parity code data are alternately arranged. For example, plural pieces of parity code data are assigned to a user data group arranged for each of a predetermined number of lines in the units of a given number of words. One user data group and plural pieces of parity data form a single block.

As shown in FIG. 1, the CD-ROM system includes a pickup section 1, a pickup controller 2, an analog signal processor 3, a digital signal processor 4, a CD-ROM decoder 5, a buffer RAM 6 and a control microcomputer 7. The pickup section 1 receives reflected light of light irradiated on a disk, and generates a voltage signal corresponding to the intensity of the reflected light.

The pickup controller 2 controls a reading position of the pickup section 1 on the disk so that the pickup section 1 can read data stored on the disk in the proper order. The disk is rotated at a predetermined speed with servo control to maintain the linear velocity of the tracks on the disk constant.

The analog signal processor 3 receives the voltage signal from the pickup section 1 and performs waveform shaping of the voltage signal to produce an EFM (Eight to Fourteen Modulation) signal. The analog signal processor 3 includes a phase-locked loop which generates a reference signal for controlling the rotation of the disk using the EFM signal.

The digital signal processor 4 receives the EFM signal from the analog signal processor 3 and performs EFM demodulation and CIRC (Cross-Interleave Reed-Solomon Code) decoding on the EFM signal to produce CD-ROM data. In the EFM demodulation, data consisting of 14 bits per word is converted to data consisting of 8 bits per word because when data is recorded on a disk, 8-bit data is converted (EFM demodulated) to 14-bit data according to predetermined rules. In the CIRC decoding, demodulated data is subjected to error correction in accordance with a Reed-Solomon code. The CIRC decoding completes the first error correction.

The CD-ROM decoder 5 receives the CD-ROM data from the digital signal processor 4, executes the second error correction on the CD-ROM data and supplies the corrected CD-ROM data to a host computer. In the second correction process by the CD-ROM decoder 5, error correction and error detection are carried out according to an ECC (Error Correcting Code) and EDC (Error Detecting Code) which are included in a parity code. Normally, the ECC and EDC are affixed to one block of CD-ROM data. The CD-ROM decoder 5 is designed to temporarily store CD-ROM data in the buffer RAM 6 until one block of CD-ROM data is acquired from the digital signal processor 4. The buffer RAM 6 temporarily stores CD-ROM data block by block.

Some CD-ROM decoders are capable of carrying out reception of CD-ROM data from the digital signal processor 4, correction of the CD-ROM data and supply of the CD-ROM data to the host computer in parallel. With such a CD-ROM decoder 5, it is preferable that the buffer RAM 6 store at least three blocks of CD-ROM data. While error correction of the first block of CD-ROM data is performed, the buffer RAM 6 can store not only the first block of CD-ROM data but also the second block of CD-ROM data to be subjected to the next error correction and the third CD-ROM data which has been error-corrected and is ready to be transferred to the host computer.

The control microcomputer 7 has a so-called one-chip structure with a ROM and RAM incorporated, and controls the CD-ROM decoder 5 and the other individual sections in accordance with a control program stored in the ROM. The control microcomputer 7 receives command data from the host computer or subcode data from the digital signal processor 4, and temporarily stores such data in its RAM. Accordingly, the control microcomputer 7 controls the individual sections in accordance with a command or instruction from the host computer in such a way that the CD-ROM decoder 5 sends the desired CD-ROM data to the host computer.

The CD-ROM decoder 5, which performs error correction, reception and outputting of CD-ROM data, includes an address generation circuit for generating an address to access the buffer RAM 6. At the time of receiving CD-ROM data, the CD-ROM decoder 5 accesses the buffer RAM 6 in accordance with the input order of the CD-ROM data. At the time of sending CD-ROM data, the CD-ROM decoder 5 responds to an instruction from the host computer. In error correction, the CD-ROM decoder 5 accesses the buffer RAM 6 in such a manner that user data is distinguished from parity bits.

To execute individual processes in parallel, the CD-ROM decoder 5 controls the timing for the individual processes and the address generation circuit generates addresses for different blocks to access the buffer RAM 6 in a time-division manner. This complicates the address generation circuit's generation of a write address signal for writing data in the buffer RAM 6 and a read address signal for reading data from the buffer RAM 6. The complex generation of address signals enlarges the circuit area of the address generation circuit and makes fast access difficult.

Such a problem is inherent to a DVD-ROM system which uses a DVD (Digital Video Disk), a high-density recording medium, as a ROM as well as the CD-ROM system. A DVD has about seven times the recording capacity of a CD. Fast operation of the decoder is required to make the playback speed for the DVD faster than that of the CD.

SUMMARY OF THE INVENTION

Accordingly, it is an objective of the present invention to provide an error correction decoder suitable for fast data transfer.

Briefly, the present invention is directed to an error correction decoder for performing error correction on input data comprising of blocks of data. Each input data includes user data and parity code data associated with the user data. The error correction decoder is connected to a first buffer memory for storing a plurality of blocks of user data and a second buffer memory for storing at least two blocks of parity code data. The error correction decoder includes an input controller for receiving the input data, storing user data in the first buffer memory in sequential addresses, and storing parity code data in the second buffer memory in sequential addresses; an error correction circuit for receiving user data and parity code data respectively read from the first and second buffer memories, performing error correction on user data and parity code data in accordance with the parity code data, and rewriting to the first and second buffer memories, the error-corrected user data and the parity code data respectively; and an output controller for controlling data read from the first buffer memory such that the error-corrected user data stored in the first buffer memory is read serially.

The present invention further provides an address generation circuit for generating address signals designating addresses in a buffer memory in order to store input data including user data and parity code data in the buffer memory while distinguishing the user data from the parity code data. The input data includes blocks of data, each block having a predetermined number of lines, each line comprising a predetermined number of words. The address generation circuit includes a word counter for counting a number of words in the input data and generating a count value thereof, wherein the count value is reset every time one line of words is counted; a line counter, connected to the word counter, for counting a number of lines in the input data in response to resetting of the count value of the word counter, wherein the line counter is reset every time one block of data is counted; a first decoder, connected to the word counter, for detecting a word input period associated with the user data based on the count value of the word counter; a second decoder, connected to the line counter, for detecting a line input period associated with the user data based on the count value of the line counter; a first address generator for generating a first address signal designating a storage address for the user data in the buffer memory while the first and second decoders are detecting the word and line input periods; and a second address generator for generating a second address signal designating a storage address for the associated parity code in the buffer memory while at least one of the first and second decoders is not detecting an associated one of the word and line input periods.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

For easier understanding of one embodiment of this invention, the fundamental design and operation of a CD-ROM decoder are described first.

Figure 3:
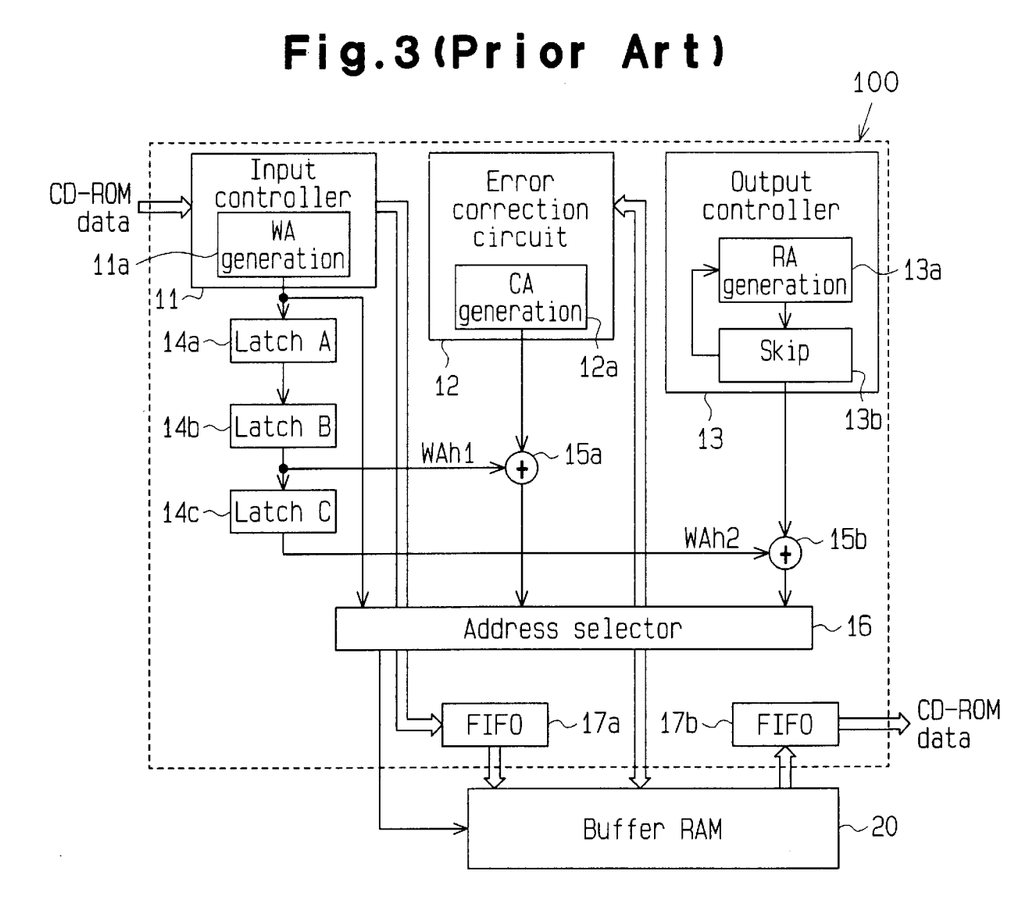
FIG. 3 is a schematic block diagram of a CD-ROM decoder of the CD-ROM system of FIG. 1.
Figure 4:
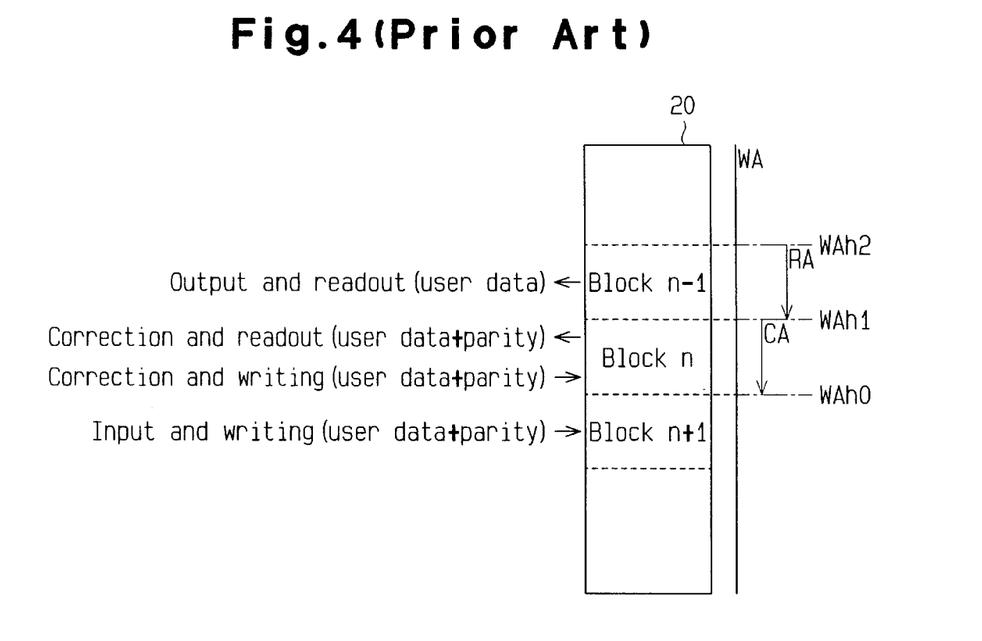
FIG. 4 illustrates the flow of data between a buffer RAM and the CD-ROM decoder.
Figure 5:
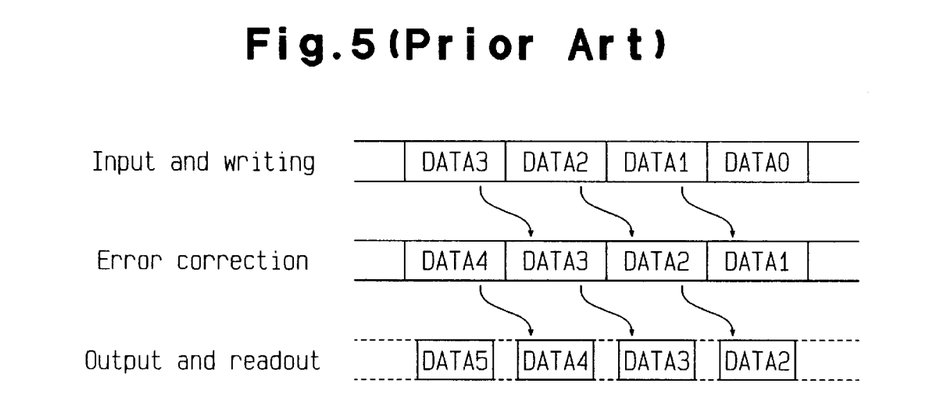
FIG. 5 shows the flow of CD-ROM data to be processed by the CD-ROM decoder of FIG. 3.

FIG. 3 is a schematic block diagram of a conventional CD-ROM decoder, FIG. 4 illustrates how a buffer RAM is used in a conventional decoder, and FIG. 5 shows the flow of data to be processed by the CD-ROM decoder.

A conventional CD-ROM decoder 100 includes an input controller 11, an error correction circuit 12, an output controller 13, latch circuits 14a, 14b and 14c, adders 15a and 15b, an address selector 16 and buffer circuits 17a and 17b. The CD-ROM decoder 100 may also be connected to a buffer RAM 20, and thus corresponds to the CD-ROM decoder 5 in FIG. 1.

The input controller 11 includes an address generation circuit 11a which generates an address signal WA. The input controller 11 receives CD-ROM data from a digital signal processor (not shown), buffers the CD-ROM data, and supplies it to the first buffer circuit 17a for data writing. The CD-ROM data output from the buffer circuit 17a is stored in the buffer RAM 20 at a predetermined address.

The first buffer circuit 17a is an FIFO (First-In First-Out) buffer for writing data into the buffer RAM 20, and temporarily stores the CD-ROM data from the input controller 11. The buffer circuit 17a serves to match the timing of supplying data to the buffer RAM 20 from the CD-ROM decoder with the timing of writing the CD-ROM data in the buffer RAM 20.

The input controller 11 acquires a sync signal associated with a header of each block of CD-ROM data, and generates a reference clock from the sync signal for synchronization of the operation of the individual sections. Further, the input controller 11 descrambles scrambled CD-ROM data to restore the CD-ROM data. As is generally known, scrambling is a process performed on a part of CD-ROM data excluding the sync signal in advance so that data of the same pattern as that of the sync signal does not exist in one block.

The address generation circuit 11a operates in accordance with the reference clock to generate the address signal WA, specifying a write address for writing CD-ROM data into the buffer RAM 20. As shown in FIG. 4, the address generation circuit 11a generates the address signal WA in such a manner that all addresses for the memory area of the buffer RAM 20 are repeatedly designated in a predetermined order. Accordingly, CD-ROM data is stored in the buffer RAM 20 at a predetermined address in the input order.

The error correction circuit 12 includes an address generation circuit 12a for generating an address signal CA. The error correction circuit 12 receives the CD-ROM data stored at a predetermined address in the buffer RAM 20, and performs error correction and detection on the received CD-ROM data. The error-corrected CD-ROM data is written again at the same address in the buffer RAM 20. For example, error correction and detection are performed on CD-ROM data in accordance with the ECC and EDC, and the memory content of the buffer RAM 20 is overwritten with the processed CD-ROM data.

The address generation circuit 12a operates in accordance with the reference clock to generate the address signal CA for specifying a read address for reading CD-ROM data from the buffer RAM 20 or a write address for writing CD-ROM data into the buffer RAM 20. As shown in FIG. 4, the address generation circuit 12a generates the address signal CA in such a way that the memory range for one block of CD-ROM data in the memory area of the buffer RAM 20 is designated. Accordingly, error correction and detection on one block of CD-ROM data stored in a specific area in the buffer RAM 20 are carried out.

The output controller 13 includes an address generation circuit 13a and an address skipping circuit 13b. The output controller 13 operates in response to an instruction from a host computer (not shown) in such a way that CD-ROM data stored in the buffer RAM 20 is read therefrom and is supplied to the second buffer circuit 17b for data reading. The buffer RAM 20 stores CD-ROM data, including user data and parity code data. It is however only the user data that is needed by the host computer. Therefore, the output controller 13 operates in such a manner that only user data in one block of CD-ROM data is read from the buffer RAM 20.

The second buffer circuit 17b is an FIFO buffer for reading data from the buffer RAM 20, and temporarily stores CD-ROM data which is read from the buffer RAM 20 in accordance with an instruction from the output controller 13. The buffer circuit 17b matches the timing of data reception from the buffer RAM 20 with the timing of transferring CD-ROM data to the host computer.

The address generation circuit 13a operates in accordance with the reference clock to generate an address signal RA for specifying a read address for reading CD-ROM data from the buffer RAM 20. As shown in FIG. 4, the address generation circuit 13a generates the address signal RA in such a way that the memory range for one block of CD-ROM data in the memory area of the buffer RAM 20 is designated.

The address skipping circuit 13b receives the address signal RA from the address generation circuit 13a, and instructs the address generation circuit 13a to skip an address where a parity code is stored, in the buffer RAM 20. Such an instruction is given because CD-ROM data has user data and parity code data arranged in a predetermined regular form as shown in FIG. 2. That is, to read only user data required by the host computer, memory addresses for parity code data in the buffer RAM 20 are skipped so that only memory addresses for user data are designated consecutively. Through this process, of error-corrected CD-ROM data, only user data needed by the host computer is read from the buffer RAM 20.

The buffer circuits 17a and 17b transfer data between the CD-ROM decoder 100 and the buffer RAM 20, match the timing for writing CD-ROM data in the buffer RAM 20 and match the timing for transferring CD-ROM data to the host computer.

The address generation circuit 11a is connected to the latch circuits 14a, 14b and 14c, which are respectively connected in series, as shown in FIG. 3. Each of the latch circuits 14a to 14c latches the address signal WA corresponding to the head of one block of CD-ROM data. The latch circuits 14a, 14b and 14c respectively shift the latched head address to the subsequent stage every time processing of one block of data is completed. Accordingly, the first-stage latch circuit 14a holds the head address, WAh0, of the first block which is currently being input. The second-stage latch circuit 14b holds the head address, WAh1, of the second block which has been input before the first block and has been subjected to error correction. The third-stage latch circuit 14c holds the head address, WAh2, of the third block which has been input before the second block and is ready to be output.

The first adder 15a, connected to the address generation circuit 12a, adds the address signal CA from the address generation circuit 12a and the head address WAh1 held in the second-stage latch circuit 14b. The second adder 15b, connected to the address skipping circuit 13b, adds the address signal RA, sent via the address skipping circuit 13b from the address generation circuit 13a, and the head address WAh2 held in the third-stage latch circuit 14c. Adding the head addresses WAh1 and WAh2 to the respective address signals CA and RA using the adders 15a and 15b permits access of each block of CD-ROM data in the associated memory range in the buffer RAM 20 for error correction and output. In other words, each block of CD-ROM data to be error-corrected and output can be accessed in the associated memory range in the buffer RAM 20 in accordance with the added output.

The address selector 16 is connected to the address generation circuit 11a and the adders 15a and 15b. In response to an instruction from a control microcomputer (not shown), the address selector 16 selects either one of the address signal WA or the added outputs from the adders 15a and 15b in accordance with the operation timings of the individual sections. The selected value is supplied to the buffer RAM 20.

As shown in FIG. 5, the input controller 11, the error correction circuit 12 and the output controller 13 operate in parallel, and access to the buffer RAM 20 is assigned, word by word, in a time-division manner.

A CD-ROM decoder according to one embodiment of this invention is described. The CD-ROM decoder according to a presently preferred embodiment is a modification of the CD-ROM decoder in FIG. 3.

Figure 6:
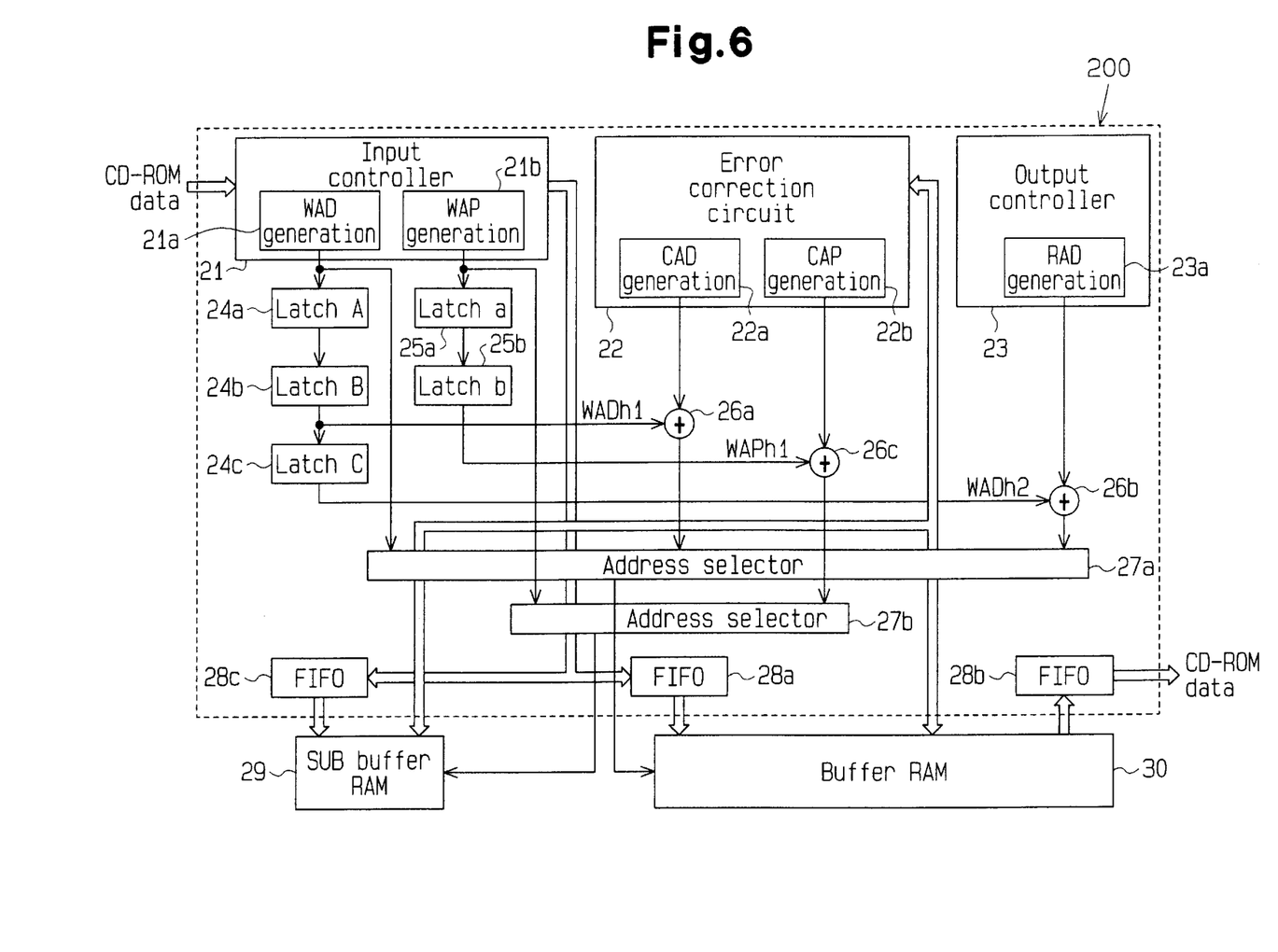
FIG. 6 is a schematic block diagram of a CD-ROM decoder according to a first embodiment of the present invention.
Figure 7:
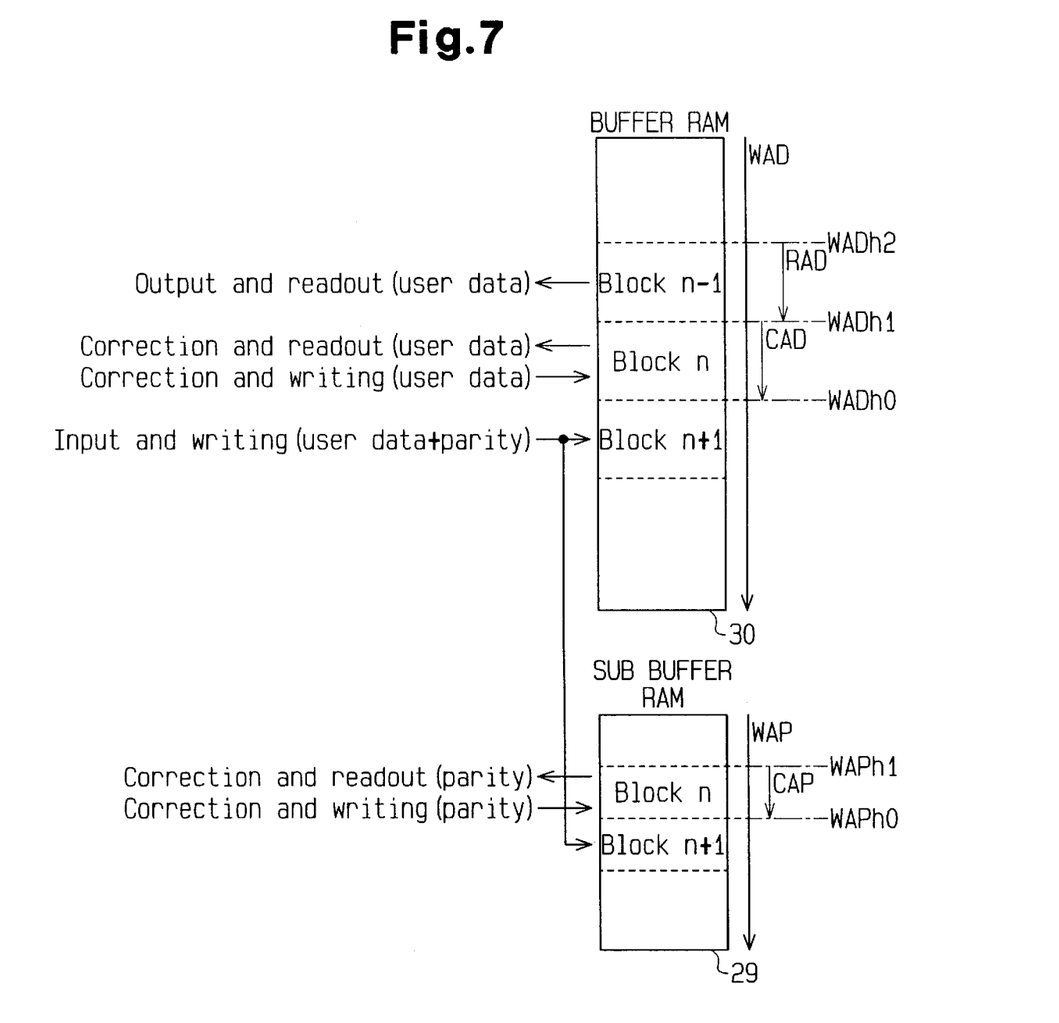
FIG. 7 illustrates how a buffer RAM and a sub buffer RAM, both connected to the CD-ROM decoder of FIG. 6, are used.

FIG. 6 is a schematic block diagram of the CD-ROM decoder 200 as an error correction decoder according to this embodiment. FIG. 7 illustrates how a buffer RAM and a sub buffer RAM are used.

The CD-ROM decoder 200 includes an input controller 21, an error correction circuit 22, an output controller 23, latch circuits 24a, 24b, 24c, 25a and 25b, adders 26a, 26b and 26c, address selectors 27a and 27b, and first, second and third buffer circuits 28a, 28b and 28c, respectively. As will be understood by those of ordinary skill in the art, the CD-ROM decoder 200, connected to a buffer RAM 30 and a sub buffer RAM 29, comprises an improved CD-ROM decoder which corresponds to the prior art CD-ROM decoder 5 shown in FIG. 1.

The input controller 21 includes an address generation circuit 21a which generates an address signal WAD for the buffer RAM 30 and an address generation circuit 21b which generates an address signal WAP for the sub buffer RAM 29. The input controller 21 receives CD-ROM data from a digital signal processor, and buffers that CD-ROM data. The input controller 21 supplies user data of the CD-ROM data to the first buffer circuit 28a, and supplies a parity code to the third buffer circuit 28c. User data output from the first buffer circuit 28a is stored at a predetermined address in the buffer RAM 30. A parity code output from the third buffer circuit 28c is stored at a predetermined address in the sub buffer RAM 29. As the other functions of the input controller 21 are the same as those of the input controller 11 in FIG. 3, an explanation thereof in not repeated herein, as such other functions will be understood by those of ordinary skill in the art.

The first buffer circuit 28a is preferably an FIFO buffer for writing data into the buffer RAM 30, and temporarily storing the user data from the input controller 21. The first buffer circuit 28a serves to match the timing of writing the user data in the buffer RAM 30.

The third buffer circuit 28c is provided for writing data into the sub buffer RAM 29, and temporarily retains the parity code from the input controller 21. The third buffer circuit 28c serves to match the timing of writing the parity code in the sub buffer RAM 29.

The first address generation circuit 21a operates in accordance with the reference clock to generate an address signal WAD for specifying a write address for writing user data into the buffer RAM 30. As shown in FIG. 7, the address generation circuit 21a generates the address signal WAD such that all addresses for the memory area of the buffer RAM 30 are repeatedly designated in a predetermined order.

The second address generation circuit 21b operates in accordance with the reference clock to generate an address signal WAP for specifying a write address for writing a parity code into the sub buffer RAM 29. As shown in FIG. 7, the address generation circuit 21b generates the address signal WAP such that all addresses for the memory area of the sub buffer RAM 29 are repeatedly designated in a predetermined order. This allows user data to be stored at predetermined addresses in the buffer RAM 30 in the input order, and allows parity code data to be stored at predetermined addresses in the sub buffer RAM 29.

The error correction circuit 22 includes an address generation circuit 22a for generating an address signal CAD for the buffer RAM 30, and an address generation circuit 22b for generating the address signal CAP for the sub buffer RAM 29. The error correction circuit 22 receives the user data stored in the buffer RAM 30 and the parity code stored in the sub buffer RAM 29, and performs error correction and detection on CD-ROM data in accordance with the parity code. The error-corrected user data and the parity code are then written back to the same respective addresses in the buffer RAM 30 and the sub buffer RAM 29. For example, error correction and detection are performed on CD-ROM data in accordance with the ECC and EDC of the parity code, and the memory contents of the buffer RAM 30 and the sub buffer RAM 29 are overwritten with the processed user data and parity code.

The first address generation circuit 22a operates in accordance with the reference clock to generate the address signal CAD for specifying a read address for reading user data from the buffer RAM 30 or a write address for writing user data into the buffer RAM 30. As shown in FIG. 7, the address generation circuit 22a generates the address signal CAD in such a way as to specify the memory range for one block of user data in the memory area of the buffer RAM 30.

The second address generation circuit 22b operates in accordance with the reference clock to generate the address signal CAP for specifying a read address for reading a parity code from the sub buffer RAM 29 or a write address for writing a parity code into the sub buffer RAM 29. As shown in FIG. 7, the address generation circuit 22b generates the address signal CAP in such a way as to specify the memory range for one block of parity code data in the memory area of the sub buffer RAM 29. Accordingly, error correction and detection are performed on one block of CD-ROM data stored at respective specific areas in the buffer RAM 30 and the sub buffer RAM 29.

The output controller 23 includes an address generation circuit 23a for generating an address signal RAD for the buffer RAM 30. The output controller 23 operates in response to an instruction from the host computer such that user data stored in the buffer RAM 30 is read therefrom and is supplied to the second buffer circuit 28b. Only user data is stored in the buffer RAM 30. The user data is read from the buffer RAM 30 and supplied to the buffer circuit 28b block by block.

The second buffer circuit 28b is preferably an FIFO buffer for reading data from the buffer RAM 30. The second buffer circuit 28b temporarily stores the user data which is read from the buffer RAM 30 in response to an instruction from the output controller 23. The second buffer circuit 28b serves to match the timing of transferring the user data from the buffer RAM 30 to the host computer.

The address generation circuit 23a operates in accordance with the reference clock to generate the address signal RAD for specifying a read address for reading user data from the buffer RAM 30. As shown in FIG. 7, the address generation circuit 23a generates the address signal RAD in such a way as to specify the memory range for one block of user data in the memory area of the buffer RAM 30. This permits the output controller 23 to read error-corrected user data from the buffer RAM 30 in response to a request from the host computer. That is, the present invention has such an advantage that plural blocks of user data are serially read from the buffer RAM 30 and transferred fast to the host computer.

The address generation circuit 21a is connected to the latch circuit 24a in the series-connected latch circuits 24a, 24b and 24c. Each of the latch circuits 24a to 24c latches the address signal corresponding to the head of user data in one block of CD-ROM data. The latch circuits 24a, 24b and 24c respectively shift the latched head address to the next subsequent stage every time processing one block of data is completed. Accordingly, the first-stage latch circuit 24a holds a head address WADh0 associated with the top user data of the first block, which is currently being input. The second-stage latch circuit 24b holds the head address WADh1 associated with the top user data of the second block which was input before the first block and was subjected to error correction. The third-stage latch circuit 24c holds a head address WADh2 associated with the top user data of the third block which was input before the second block. It should be noted that the third block of data is ready to be output.

The address generation circuit 21b is connected to the latch circuit 25a in the series-connected latch circuits 25a and 25b. Each of the latch circuits 25a and 25b latches the address signal corresponding to the top one of the parity code data in one block of CD-ROM data from the address signal WAP output from the address generation circuit 21b. The latch circuits 25a and 25b respectively shift the latched head address to the subsequent stage every time processing one block of data is completed. Accordingly, the first-stage latch circuit 25a holds a head address WAPh0 associated with the top parity code of the first block, which is currently being input. The second-stage latch circuit 25b holds the head address WAPh1 associated with the top parity code of the second block which was input before the first block and has already been subjected to error correction.

The first adder 26a, connected to the address generation circuit 22a, adds the address signal CAD from the address generation circuit 22a and the head address WADh1 held in the second-stage latch circuit 24b. The second adder 26b, connected to the address generation circuit 23a, adds the address signal RAD from the address generation circuit 22b, and the head address WADh2 held in the third-stage latch circuit 24c.

The address signal CAD from the address generation circuit 22a and the address signal RAD from the address generation circuit 23a each specify the range of the memory area of the buffer RAM 30 corresponding to one block of user data. Adding the head addresses WADh1 and WADh2 to the respective address signals CAD and RAD using the adders 26a and 26b, therefore, permits easy access to each block of user data in the associated memory range in the buffer RAM 30 for error correction and output. That is, each block of user data to be error-corrected and output is accessed in the associated memory range in the buffer RAM 30 in accordance with the added output.

The third adder 26c, connected to the address generation circuit 22b, adds the address signal CAP from the address generation circuit 22b and the head address WAPh1 held in the second-stage latch circuit 25b. The address signal CAP specifies the range of the memory area of the sub buffer RAM 29 corresponding to one block of parity code data. Adding the head address WAPh1 to the address signal CAP using the adder 26c, therefore, permits access to one block of parity code data in the associated memory range in the sub buffer RAM 29 for error correction and output. Thus, one block of parity code data to be used in error correction is accessed in the associated memory range in the sub buffer RAM 29 in accordance with the added output.

The first address selector 27a is connected to the address generation circuit 21a and the first and second adders 26a and 26b. In response to an instruction from a control microcomputer (not shown), the first address selector 27a selects either one of the address signal WAD or the added outputs from the adders 26a and 26b in accordance with the operational timing of the individual sections, and supplies the one selected address to the buffer RAM 30.

The second address selector 27b is connected to the address generation circuit 21b and the adder 26c. In response to an instruction from the control microcomputer (not shown), the second address selector 27b selects either the address signal WAP or the added output from the adder 26c in accordance with the operational timing of the individual sections, and supplies the one selected address to the sub buffer RAM 29.

A description of an operation for accessing the buffer RAM 30 and the sub buffer RAM 29 and error correction of CD-ROM data is set forth below with reference to FIG. 7. It is assumed that the error correction circuit 22 performs error correction on the n th CD-ROM data. At this time, the input controller 21 receives the next (n+1) th block of CD-ROM data, and writes the user data and parity code data thereof in the respective buffer RAM 30 and the sub buffer RAM 29. The output controller 23 reads the (n−1) th block of user data which has undergone error correction and is stored in the buffer RAM 30. The n th block of CD-ROM data is stored in the buffer RAM 30 and the sub buffer RAM 29 by the input controller 21 before the (n+1) th block of CD-ROM data.

The input controller 21 writes the user data of the (n+1) th block of CD-ROM data in the buffer RAM 30 in accordance with the address signal WAD, and writes parity code data in the sub buffer RAM 29 in accordance with the address signal WAP. The address signal WAD designates all of the addresses of the memory area of the buffer RAM 30, in order. Therefore, the user data is stored in the memory area of the buffer RAM 30 to be aligned block by block. The address signal WAP has been generated to designate all the addresses of the memory area of the sub buffer RAM 29 in order. Therefore, plural pieces of parity code data are stored in the memory area of the sub buffer RAM 29 and aligned block by block.

The error correction circuit 22 accesses the buffer RAM 30 in such a manner that the n th block of user data including the top user data associated with the address WADh1 is read therefrom. At the same time, the error correction circuit 22 accesses the sub buffer RAM 29 in such a manner that the n th block of parity code data including the top parity code associated with the address WAPh1 is read therefrom. Specifically, the head address WADh1 is added to the address signal CAD with the first adder 26a such that access to the buffer RAM 30 starts at the address WADh1. Further, the head address WAPh1 is added to the address signal CAP with the second adder 26b such that access to the sub buffer RAM 29 starts at the address WAPh1. The head addresses WADh1 and WAPh1 are respectively latched by the latch circuits 24a and 25a when the user data and parity code data of the (n−1) th block have been written in the respective buffer RAM 30 and sub buffer RAM 29.

The output controller 23 accesses the buffer RAM 30 such that one block of user data, including the top user data associated with the address WADh2, is read therefrom. Specifically, the head address WADh2 is added to the address signal RAD with the third adder 26b such that access to the buffer RAM 30 starts at the address WADh2. The head address WADh2 is latched by the latch circuit 24a at the time of writing the (n−2) th block of user data in the buffer RAM 30. The parity code data, which need not be transferred to the host computer, are no longer necessary after the error correcting process is completed.

Thus, according to the present invention, the buffer RAM 30 is accessed according to the address signal WAD at the same time user data is input (written) and the input data is accessed according to the address signals CAD and RAD at the time error correction and outputting user data are performed. Further, the sub buffer RAM 29 is accessed according to the address signal WAP at the time plural pieces of parity code data are input. The sub buffer RAM 29 is accessed according to the address signal CAP at the time error correction is performed.

The buffer RAM 30 preferably has a capacity large enough to store at least three blocks of user data. The sub buffer RAM 29 preferably has sufficient capacity to store at least two blocks of parity code data. Since the buffer RAM 30 has a relatively large capacity, it is presently difficult to construct or implement the buffer RAM 30 and the CD-ROM decoder 200 as a single IC. However, the sub buffer RAM 29 has a smaller capacity than the buffer RAM 30, the sub buffer RAM 29 can be embodied together with the CD-ROM decoder 200 in a single IC. Fabricating the sub buffer RAM 29 and the decoder 200 as a single chip eliminates the need for electrical connection of the sub buffer RAM 29 to the CD-ROM decoder 200 on a circuit board.

Although the present invention is embodied in a CD-ROM system which uses a CD as a recording medium, the present invention may also be adapted to systems which use other recording media, such as a magneto-optical disk or a magnetic tape.

Figure 9:
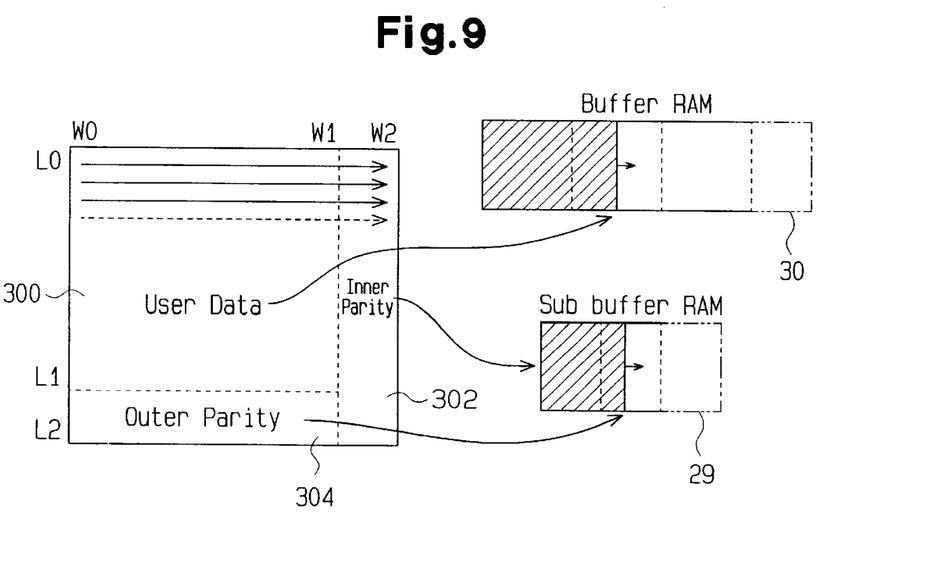
FIG. 9 shows the format of CD-ROM data written in the buffer RAM and sub buffer RAM, in which plural types of parity code data are associated therewith.

In a recording system using various kinds of recording media as well as the above-described CD-ROM system, plural types of parity bits may be added to data to enhance error correction. For example, two kinds of parity bits are added as multiplication product codes to two types of code sequences. Referring now to FIG. 9, one block of user data 300 is arranged in units of a given number of words, line by line. An inner parity code 302 is affixed, concatenated, or otherwise associated with the last portion of a sequence of codes in the line direction, that is, the last portion of each line. An outer parity code 304 is associated with a sequence of codes intersecting the code sequence in the line direction. That is, the outer parity code data 304 are affixed to the user data 300 over a plurality of lines. Accordingly, error correction on the user data 300 using the inner parity code data 302 and error correction on the user data 300 using the outer parity code data 304 are carried out. In this case, the designation of addresses for storing the user data 300 and the parity code data 302 and 304 in the buffer RAM 30 and the sub buffer RAM 29 becomes complex.

Figure 8:
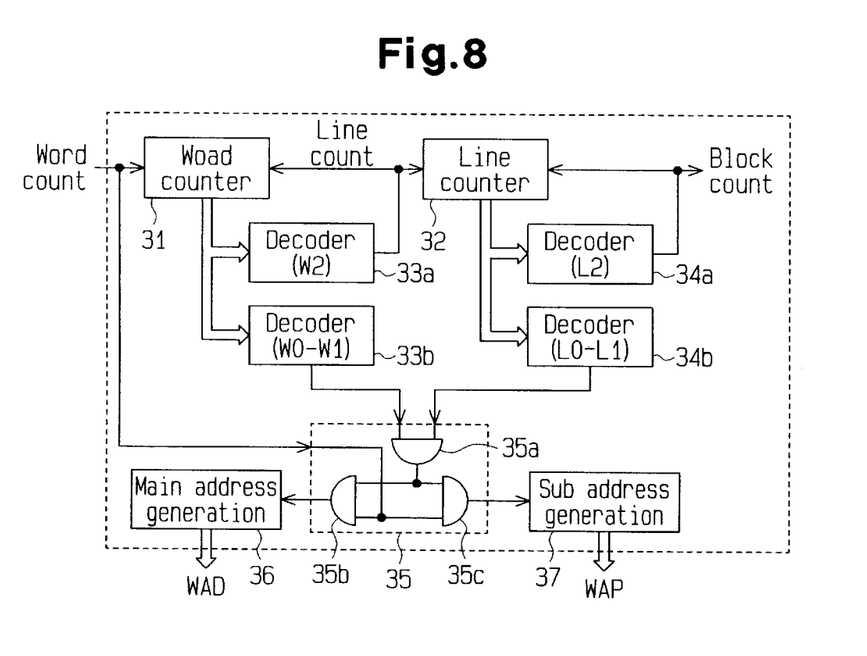
FIG. 8 is a schematic block diagram of an address generation circuit according to a second embodiment of the present invention.

Referring now to FIG. 8, a block diagram of an address generation circuit according to a second embodiment of the present invention is shown. According to the second embodiment, the present invention is designed to simplify address designation for data with plural types of parity code data. The address generation circuit according to the second embodiment designates addresses such that user data and parity code data are respectively stored in the buffer RAM 30 and the sub buffer RAM 29 while distinguishing the user data from plural types of parity code data.

Referring again to FIG. 9, one block of CD-ROM data is arranged such that words are aligned from W0 to W2 per line and lines are aligned from L0 to L2. Specifically, the words from W0 to W1 are assigned to user data and the words from W1 to W2 are assigned to parity code data in each line. Further, the lines from L0 to L1 are assigned to user data and associated inner parity code data, and the lines from L1 to L2 are assigned to associated outer parity code data.

Referring now to FIG. 8, an address generation circuit 250 includes a word counter 31, a line counter 32, word decoders 33a and 33b, line decoders 34a and 34b, a selector 35, a main address generator 36, and a sub address generator 37. The address generation circuit 250 is used as the two address generation circuits 21a and 21b in the input controller 21 of the CD-ROM decoder shown in FIG. 6.

In response to a word count signal synchronous with the input of CD-ROM data (preferably a word count signal supplied from the control microcomputer), the word counter 31 counts the number of words in the CD-ROM data and sends a count value to the word decoders 33a and 33b. In response to a line count signal, the line counter 32 counts the number of lines of the CD-ROM data and sends the count value to the line decoders 34a and 34b. The line count signal is enabled every time the word counter 31 counts one line of words.

The first word decoder 33a enables its output to reset the word counter 31 and permit the count-up of the line counter 32 when the count value of the word counter 31 reaches a value corresponding to W2. Accordingly, the word counter 31 repeatedly counts the number of words in the CD-ROM data between W0 and W2.

The second word decoder 33b enables its output to indicate the input period for user data in each line while the count value of the word counter 31 indicates a value from W0 to W1.

The first line decoder 34a enables its output to reset the line counter 32 when the count value of the line counter 32 reaches a value corresponding to L2. Accordingly, the line counter 32 repeatedly counts the number of lines of the CD-ROM data between L0 and L2. The decoded output of the line decoder 34a is used as a block count signal for counting the number of blocks of CD-ROM data.

The second line decoder 34b enables its output to indicate the input period for user data in one block while the count value of the line counter 32 indicates a value from L0 to L1.

The selector 35 receives the decoded outputs from the word decoder 33b and the line decoder 34b, and selectively supplies the word count signal to either the main address generator 36 or the sub address generator 37 in response to each decoded output. Specifically, when each decoded output is enabled (when the input period for user data is indicated), the selector 35 sends the word count signal to the main address generator 36. The main address generator 36 generates an address signal WAD for the buffer RAM 30 in accordance with the word count signal. When one of the decoded outputs or both are not enabled (when the input period for parity code data is indicated), the selector 35 sends the word count signal to the sub address generator 37. The sub address generator 37 generates an address signal WAP for the sub buffer RAM 29 in accordance with the word count signal.

The selector 35 preferably includes a logic gate 35a which generates a logical product of the decoded outputs of the decoders 33b and 34b, a logic gate 35b which passes the word count signal when the output of the logic gate 35a is enabled, and a logic gate 35c which passes the word count signal when the output of the logic gate 35a is not enabled.

The main address generator 36 includes a counter (not shown) which performs counting in response to the word count signal from the selector 35, and generates the address signal WAD for designating addresses in a predetermined order over the entire memory area of the buffer RAM 30. Further, the main address generator 36 generates the address signal such that all the memory areas of the buffer RAM 30 are repeatedly accessed. That is, when the address reaches the last one, address generation is then repeated beginning with the first address. As shown in FIG. 9, therefore, user data in CD-ROM data is written in the memory area of the buffer RAM 30 in a predetermined order. When the address reaches the last one in the buffer RAM 30, the first address is then accessed to overwrite the old user data with new one. This overwriting is permitted by the use of the buffer RAM 30 which has a sufficient capacity to store user data necessary for processing by the CD-ROM decoder. In other words, when writing of user data by the input controller 21 comes to the last address, the user data stored at the first address is no longer necessary and that user data is overwritten with new user data.

The sub address generator 37 includes a counter (not shown) which performs counting in response to the word count signal from the selector 35. The sub address generator 37 generates an address signal WAP which designates addresses in a predetermined order over the entire memory area of the sub buffer RAM 29. Further, the sub address generator 37 generates the address signal such that all of the memory areas of the sub buffer RAM 29 are repeatedly accessed. Accordingly, parity code data in CD-ROM data are written in the memory area of the sub buffer RAM 29 in a predetermined order. When the address reaches the last one in the sub buffer RAM 29, the first address is then accesses again and the old parity code is overwritten with a new one.

The sub buffer RAM 29 has a capacity large enough to store the parity code data necessary for processing by the CD-ROM decoder. In other words, when writing of parity code data by the input controller 21 comes to the last address of the sub buffer RAM 29, the parity code stored at the first address is no longer necessary and that parity code is overwritten with a new parity code.

The address generation circuit 250 according to this embodiment is constructed simply of a combination of counters and decoders. The use of the address generation circuit 250 with such a simple structure to generate address signals while distributing user data and parity code data can be used not only with the code sequences shown in FIG. 9, but also with various other kinds of data which includes user data and parity code data alternately arranged.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An error correction decoder for performing error correction on input data comprising of blocks of data, each including user data and parity code data associated with said user data, each block having a predetermined number of lines, each line comprising a predetermined number of words, said error correction decoder being connected to a first buffer memory for storing a plurality of blocks of user data and a second buffer memory for storing at least two blocks of parity code data, said error correction decoder comprising;

an input controller for receiving said input data, storing said user data in said first buffer memory in sequential addresses, and storing said parity code data in said second buffer memory in sequential addresses;

an address generation circuit including,
   a word counter for counting a number of words in said input data and generating a count value thereof, wherein the count value is reset every time one line of words is counted,
   a line counter, connected to said word counter, for counting a number of lines in said input data in response to resetting of said count value of said word counter, wherein said line counter is reset every time one block of data is counted,
   a first decoder, connected to said word counter, for detecting a word input period associated with said user data based on said count value of said word counter,
   a second decoder, connected to said line counter, for detecting a line input period associated with said user data based on said count value of said line counter,
   a first address generator for generating a first address signal designating a storage address for said user data in said first buffer memory while said first and second decoders are detecting said word and line input periods, and
   a second address generator for generating a second address signal address signal designating a storage address for said associated parity code data in said second buffer memory while at least one of said first and second decoders is not detecting an associated one of said word and line input periods;

an error correction circuit for receiving user data and parity code data respectively read from said first and second buffer memories, performing error correction on said user data and said parity code data in accordance with said parity code data, and rewriting to said first and second buffer memories, error-corrected user data and parity code data respectively; and an output controller for controlling data read from said first buffer memory such that said error-corrected user data stored in said first buffer memory is read serially.

2. The error correction decoder according to claim 1, wherein said error correction circuit generates user address signals corresponding to one block of user data and parity address signals corresponding to one block of parity code data; and said error correction decoder further comprises:
   a latch circuit for latching said first address signal associated with a top one of each block of user data and said second address signal associated with a top one of each block of parity code data; and
   an adder, connected to said latch circuit, for respectively adding said first and second address signals latched in said latch circuit, to said user and parity address signals generated by said error correction circuit.

3. The error correction decoder according to claim 1, wherein the latch circuit latches said first and second address signals every time said inputting of one block of input data is completed.

4. The error correction decoder according to claim 1, wherein said error correction decoder and said second buffer memory comprise a single IC.

* * * * *